Figure 1:
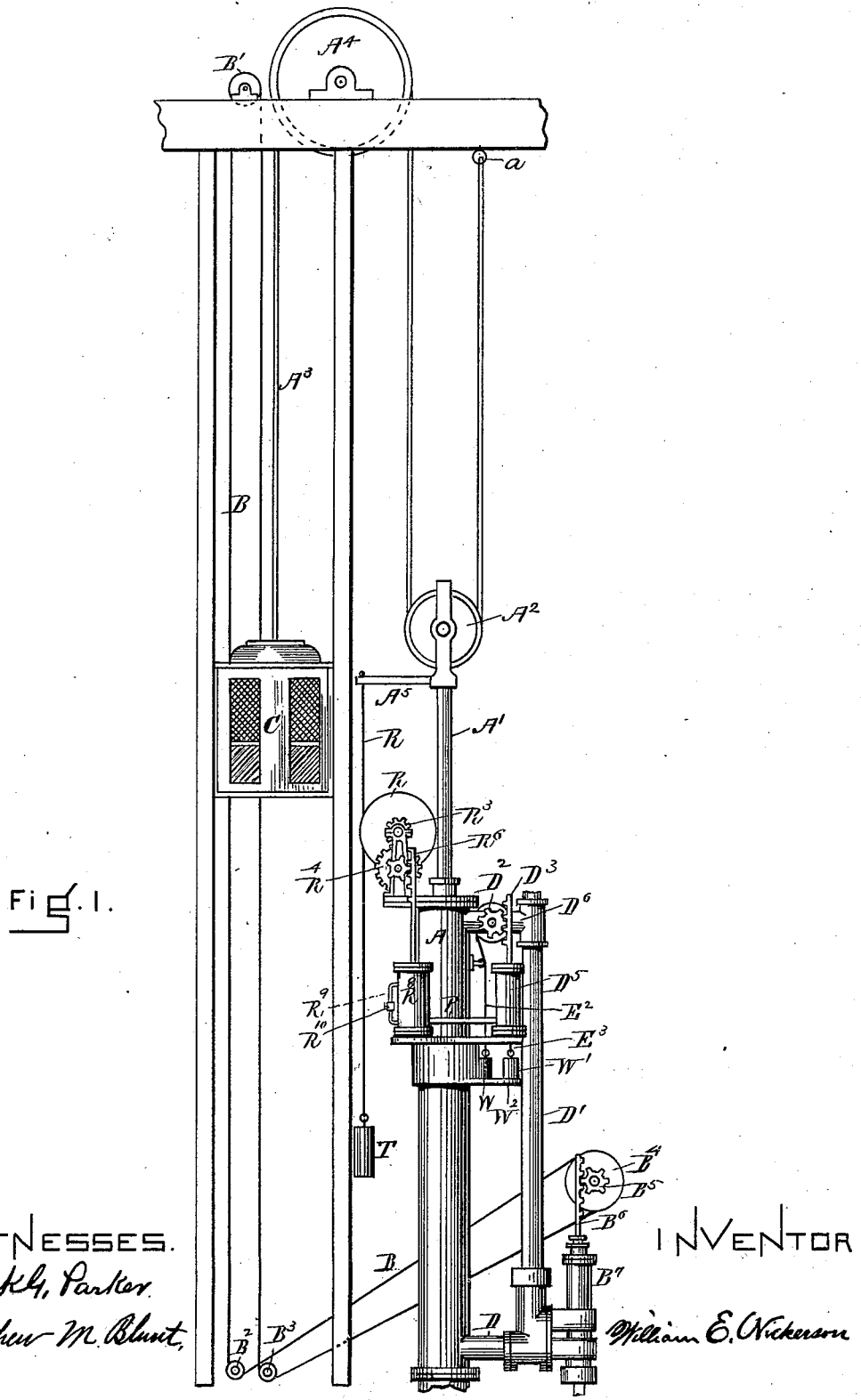

(No Model.) 2 Sheets—Sheet 1.

W. E. NICKERSON.
SELF REGULATING HYDRAULIC ELEVATOR.

No. 404,726. Patented June 4, 1889.

WITNESSES.
Frank G. Parker
Matthew M. Blunt

INVENTOR
William E. Nickerson (No Model.) 2 Sheets—Sheet 2.
W. E. NICKERSON.
SELF REGULATING HYDRAULIC ELEVATOR.
No. 404,726. Patented June 4, 1889.
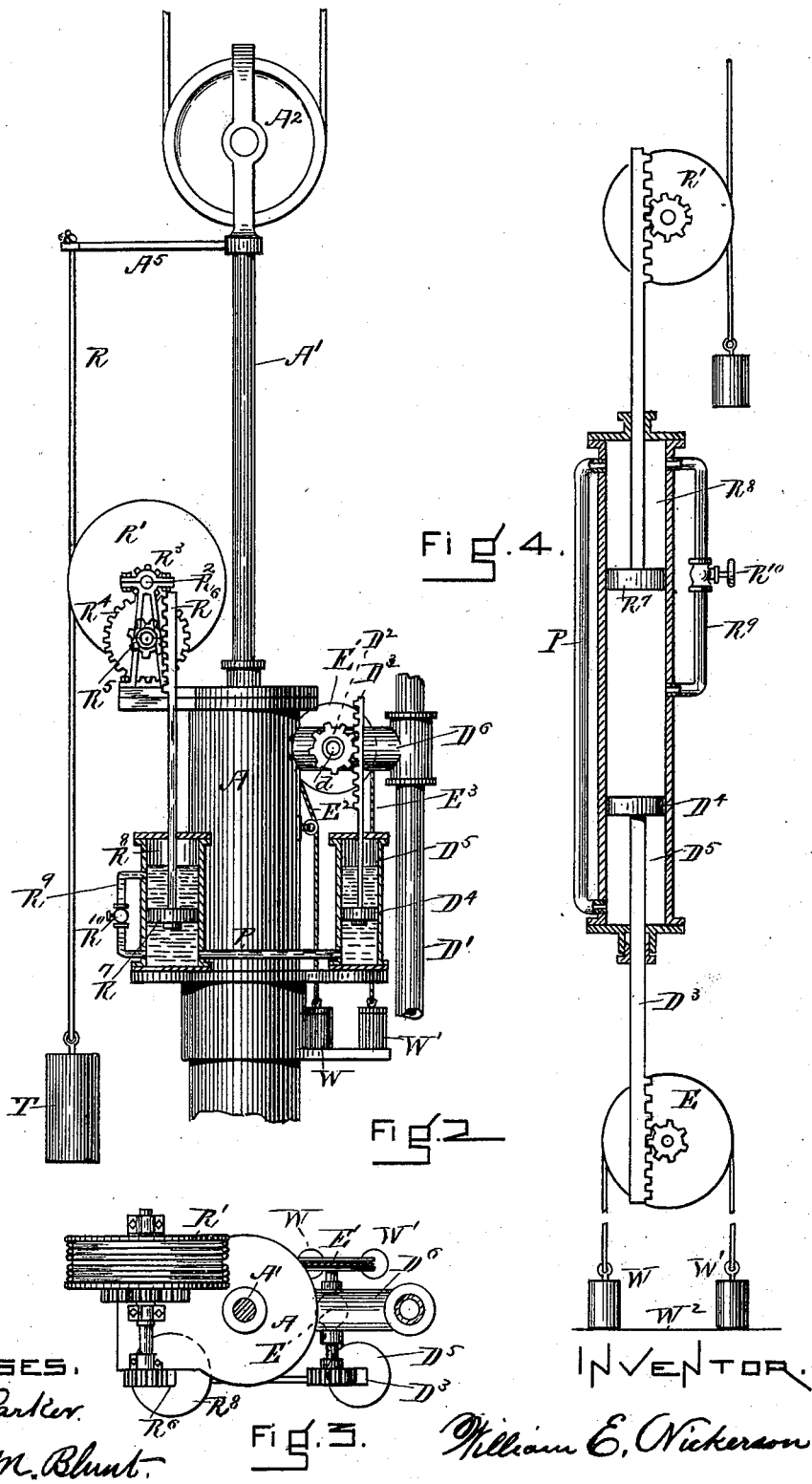

UNITED STATES PATENT OFFICE.

WILLIAM E. NICKERSON, OF CAMBRIDGE, MASSACHUSETTS.

SELF-REGULATING HYDRAULIC ELEVATOR.

SPECIFICATION forming part of Letters Patent No. 404,726, dated June 4, 1889.

Application filed March 25, 1889. Serial No. 304,700. (No model.)

*To all whom it may concern:*

Be it known that I, WILLIAM EMERY NICKERSON, of Cambridge, in the county of Middlesex and State of Massachusetts, have invented certain new and useful Improvements in Self-Regulating Hydraulic Elevators, of which the following, taken in connection with the accompanying drawings, is a specification.

My invention is embodied in a device connected to the carriage-moving mechanism of a hydraulic elevator; and it consists of a piston adapted to move at a velocity bearing a constant ratio to the velocity of the elevator-carriage, said piston in its movements causing a flow of water or some other fluid through a passage so proportioned that when the carriage is moving at or within its normal velocity then there will not be any tendency to either too great a pressure under the piston or a vacuum, and in connecting to the above cylinder a second cylinder having within it a piston connected to a valve which regulates the flow of fluid into or out of the hoisting-cylinder and thus regulates the velocity of the main piston and through it the velocity of the carriage.

In describing my invention I make use of the accompanying drawings, in which Figure 1 is an elevation of one mode of applying my regulating device to an elevator. Fig. 2 is a view, partly in elevation and partly in vertical section, showing the leading features. Fig. 3 is a plan showing most of the parts. Fig. 4 is a view in elevation and section of a modification.

In Fig. 1 the carriage C is represented as part way up and suspended by the hoisting-rope $A^3$, which passes over the pulley $A^4$, down to and under the pulley $A^2$, attached to the piston-rod $A'$, and thence up to the point $a'$, where it is firmly secured. The piston-rod $A'$ is connected to the main hoisting-piston (not shown) within the hoisting-cylinder A.

As a convenient means of connecting my regulating device to the moving mechanism to the form of elevator shown, I attach an arm $A^5$ to the piston-rod $A'$, and to this arm $A^5$, I attach a rope R, said rope R passing around the drum $R'$ a sufficient number of times and preferably fastened to it to secure a rotation of the pulley with any movement of the rope. At the lower end of the rope R, I have a weight T, which serves as a retractor. A train of gears $R^3$ $R^4$ $R^5$ connect the shaft $R^2$ of the pulley $R'$ to the rack $R^6$, formed on the piston-rod of the piston $R^7$. The piston $R^7$ moves in a cylinder $R^8$ and through the means above described is moved by the action of the water in the hoisting-cylinder A—that is, it moves as the elevator-carriage moves— and with a velocity that always has a fixed ratio to the velocity of the elevator-carriage. The movement of the piston $R^7$ in the cylinder $R^8$ of necessity causes a flow of the fluid in the cylinder $R^8$ through the pipe $R^9$, and as this pipe $R^9$ has a regulating-valve at $R^{10}$, by which the flow of fluid can be regulated or restricted, it is evident that pressure upon the fluid under the piston $R^7$ may be made more or less for a certain velocity of the piston $R^7$ by setting the valve $R^{10}$. It will be observed that as the piston $R^7$ descends the pressure is increased and is positive in relation to the ordinary atmospheric pressure, and as the piston $R^7$ ascends the pressure is negative as to the atmospheric pressure. I take advantage of this varying pressure of the fluid in the lower part of the cylinder $R^8$ for the purpose of moving the regulating-valve E of the main cylinder A.

My device for utilizing the varying pressure of the fluid in the cylinder $R^8$, due to the velocity of motion of the carriage (as transmitted to the piston $R^7$) for the purpose of regulating the velocity of movement of the hoisting-piston, and consequently that of the elevator-carriage, I will now describe.

P, Figs. 1 and 2, represents a pipe leading from the cylinder $R^8$ to the valve-operating cylinder $D^5$. This cylinder $D^5$ has a piston $D^4$, (see Fig. 2,) which is connected by a rack $D^3$ to the rack-pinion $D^2$ on the shaft $d$ of the regulating-valve E. The valve E is placed in the pipe $D^6$, and is not intended to entirely prevent the passage of water through it, but simply to check it to the required degree for insuring the normal velocity of the elevator-carriage.

The shaft $d$ of the valve E has upon it a pulley $E'$, about which a cord $E^2$ $E^3$ passes. The cord $E^2$ $E^3$ is so attached to the pulley that it cannot slip, and if the pulley $E'$ is turned in either direction by the movement of the piston-rod rack $D^3$ then one of the weights W W' will be lifted from its resting-place W². Thus the weights W W', when in the normal position—that is, resting upon the shelf W²—will hold the pulley E' in such a position that the valve E will be wide open and admit of the free passage of water through the pipe $D^6$ in either direction.

Water is let on to or cut off from the cylinder A by means of a valve in the cylinder $B^7$, Fig. 1. This valve is operated by the hand-rope B, which passes through the elevator-carriage C, about the sheaves B', $B^2$, and $B^3$, to the pulley $B^4$, which acts through the pinion $B^5$ and rack-piston rod $B^6$, the hand-rope B being operated by the attendant in the usual manner.

In Fig. 4 I have shown a slight modification of my device. This modification consists in forming the cylinder $R^8$ long enough to include a space for the piston $D^4$ of the cylinder $D^5$ of Fig. 2 to work in. In other words, the cylinders $R^8$ and $D^5$ of Fig. 2 are inserted in a single long cylinder, as shown in Fig. 4, all of the other parts being essentially the same in construction and operation.

The operation of my device is as follows: Suppose, for instance, that the elevator-carriage is going up. This action of the carriage will cause the piston $R^7$ (see Fig. 2) to descend. Now, if the descent is too rapid, then the fluid in the cylinder $R^8$ cannot flow rapidly enough through the pipe or passage $R^9$, and consequently will generate sufficient pressure under the piston $R^7$ to send the surplus of fluid through the pipe P into the lower part of the cylinder $D^5$ and force the piston $D^4$ upward, overcoming the tendency of the weight W' to hold the valve E wide open, and causing (through the rack $D^3$ and pinion $D^2$) the valve E to partly close and check the flow of water through the pipe $D^6$, and thus reduce the speed of the elevator-carriage. If the elevator were going down, then the piston $R^7$ would be going up, and if moving too rapidly the fluid from the upper part of the cylinder $R^8$ would not flow fast enough through the pipe $R^9$ to supply the tendency to a vacuum in the lower part of the cylinder $R^8$; hence fluid would be drawn from the under side of the piston $D^4$ in the cylinder $D^5$. This would draw the piston $D^4$ down, and, acting through the rack and pinion $D^3$ $D^2$, would partly close the valve E in opposition to the weight W, and check the flow of water in the pipe $D^6$, and consequently the speed of the elevator-carriage, as before. As has already been explained, any movement of the valve E from its wide-open or normal position will cause a movement of the pulley E' and consequently the lifting of one of the weights W W', and sustaining it so long as the force due to too great a speed of the elevator-carriage is exerted on the piston $D^4$; but as soon as the force is withdrawn, as it will be by the lessened speed of the elevator-carriage, then the weight W or W', that is held up, will descend to its resting place and restore the valve E to its normal position.

In the device shown for transmitting the motion of the prime mover to the regulating apparatus I have shown a gear-and-rack device for reducing the amount of motion of the main piston so as to cause the pressure-piston $R^7$ to be confined in its length of stroke to a short cylinder; but in practice the piston R may be so connected to the piston of the prime-mover that it may have a length of stroke equal to or even exceeding the length of stroke of the piston of the prime mover.

It is evident that the velocity of movement sufficient to cause the throttle-valve E to shut off is dependent on the one hand on the amount of restriction imposed on the flow of liquid by the valve $R^{10}$, and on the other hand on the size of the weights W W', so that the limit of speed of the elevator is set by varying either the opening of the valve $R^{10}$ or the size of the weights W W', or both.

I claim—

1. In a hydraulic elevator, the combination of the main hoisting-piston and its cylinder, and a port for inlet and outlet having a throttle-valve held normally open by a retractor device, with a piston located in a fluid-cylinder and adapted to close said throttle-valve (when the hoisting mechanism of the elevator attains undue speed) by impulse generated by the motion of a secondary piston adapted to move with a fixed ratio to the hoisting mechanism, said secondary piston being located in a secondary cylinder having a restricted passage from one side of its piston to the other, and a fluid connection with the cylinder containing the valve-moving piston, substantially as described, and for the purpose set forth.

2. In a hydraulic elevator, the combination of the main cylinder A and its piston and piston-rod, port $D^6$, for inlet and outlet, having a throttle-valve E, and valve-retractor device consisting of the pulley E', rope $E^2$ $E^3$, and weights W W', with the piston-rack $D^3$, piston $D^4$, cylinder $D^5$, pipe P, cylinder $R^8$, having a restriction-pipe $R^9$, and piston $R^7$, adapted to move in a fixed ratio to the movement of the elevator-carriage, substantially as and for the purpose set forth.

In testimony whereof I have signed my name to this specification, in the presence of two subscribing witnesses, on this 22d day of March, A. D. 1889.

WILLIAM E. NICKERSON.

Witnesses:
FRANK G. PARKER,
MATTHEW M. BLUNT.